April 2, 1940.     H. ROGER     2,195,425
PROJECTOR
Filed June 23, 1938     5 Sheets-Sheet 1

Inventor
HENRY ROGER
By Chas. K. Davies & Son
Attorney

April 2, 1940. H. ROGER 2,195,425
PROJECTOR
Filed June 23, 1938 5 Sheets-Sheet 2

SCREEN

Inventor
HENRY ROGER
By Chas K. Davies & Son
Attorney

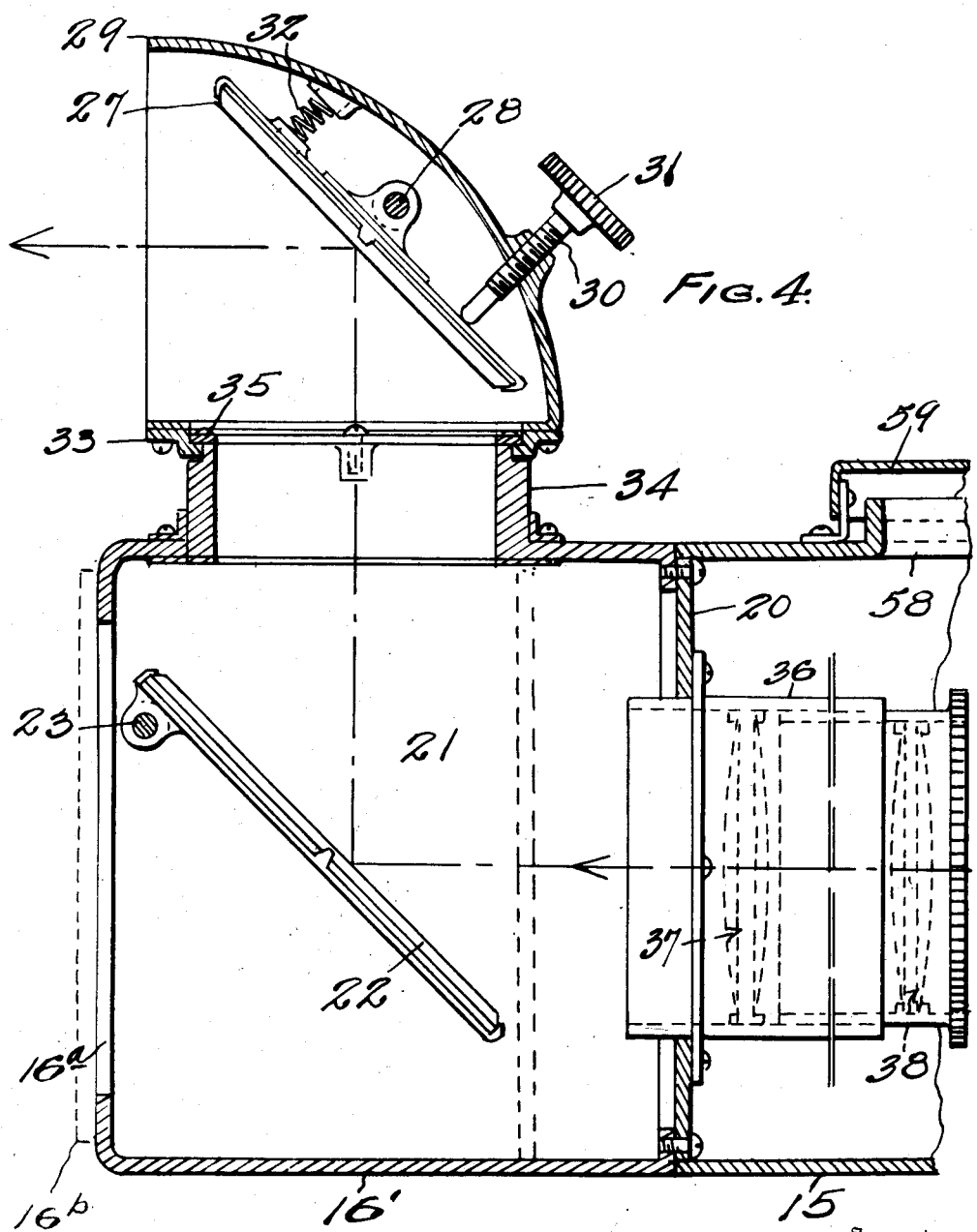

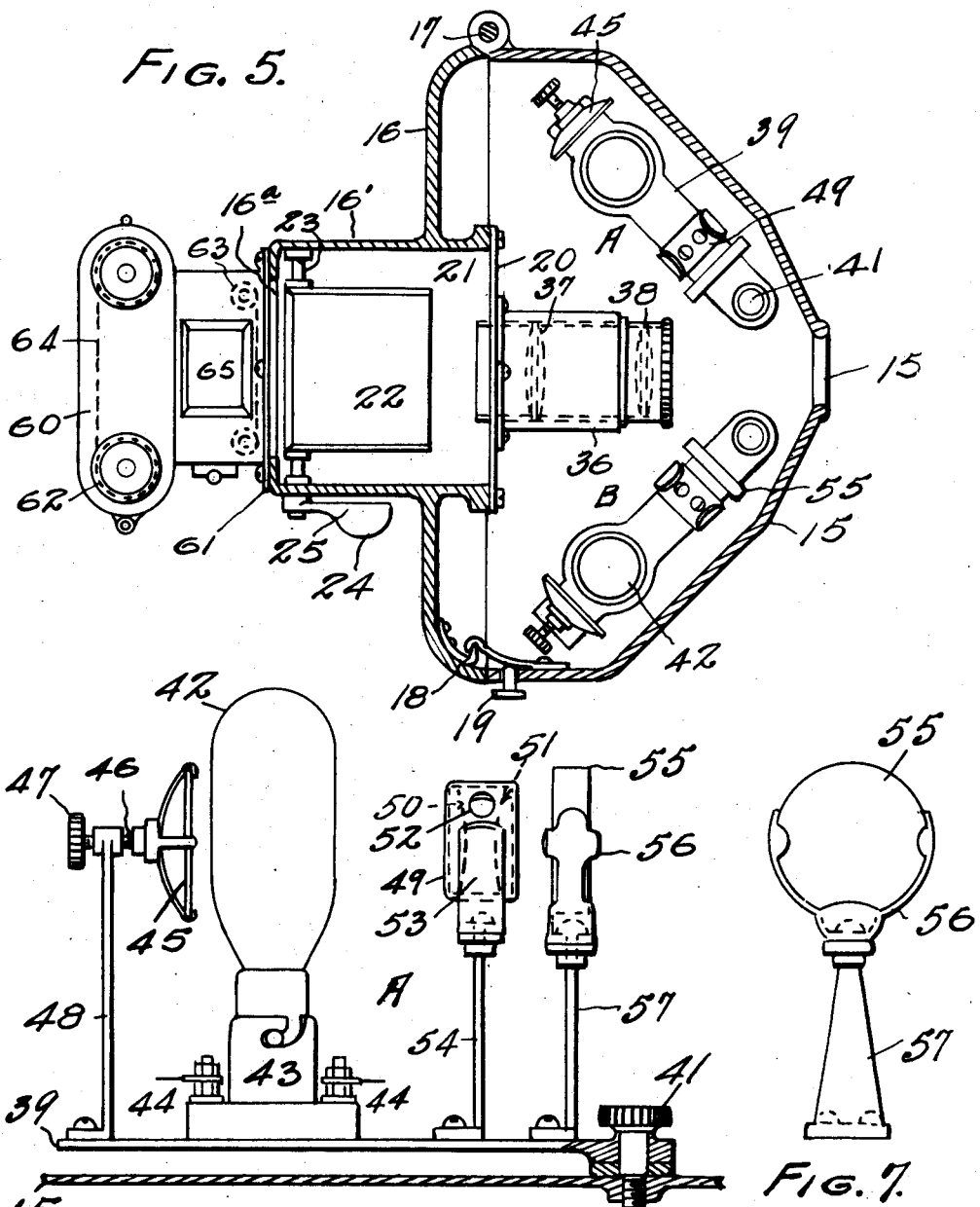
April 2, 1940.  H. ROGER  2,195,425
PROJECTOR
Filed June 23, 1938  5 Sheets-Sheet 4
Inventor
HENRY ROGER
By Chas K. Davies+Son
Attorney April 2, 1940.  H. ROGER  2,195,425
PROJECTOR
Filed June 23, 1938  5 Sheets-Sheet 5
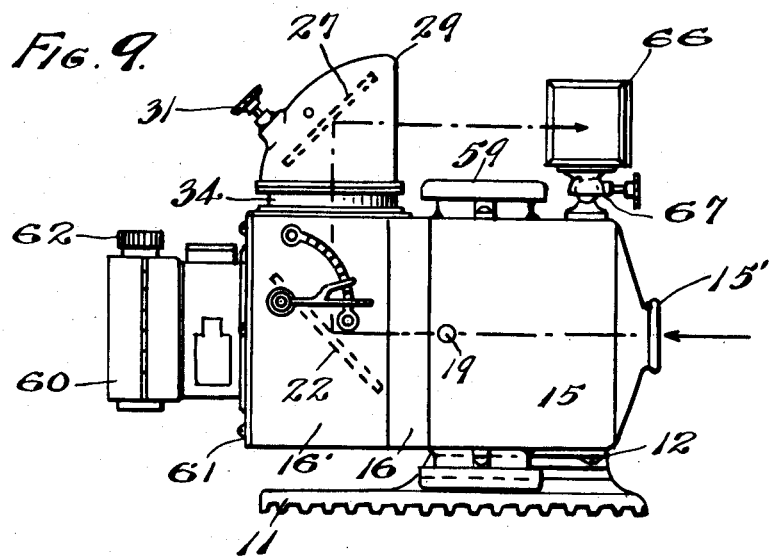
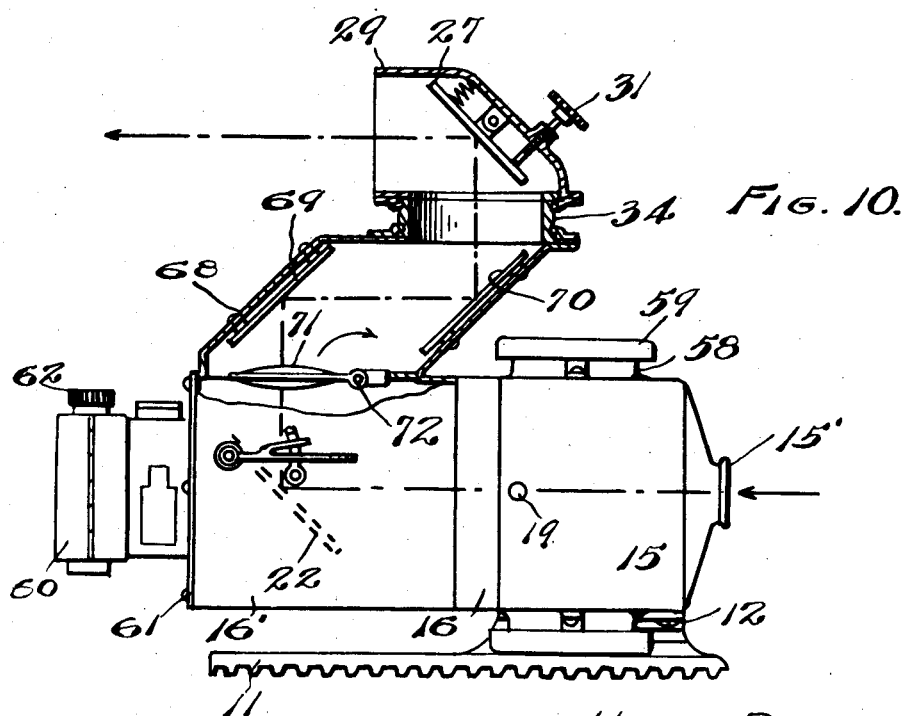
Inventor
HENRY ROGER
By Chas. K. Davies & Son
Attorney Patented Apr. 2, 1940

2,195,425

UNITED STATES PATENT OFFICE 2,195,425

PROJECTOR

Henry Roger, Sandy Hook, Conn.

Application June 23, 1938, Serial No. 215,447

9 Claims. (Cl. 88—24)

My present invention relates to an improved projector of the reflex type involving apparatus for projecting real images. While the projector of my invention is well adapted for numerous uses, it is especially designed as an optical instrument to be employed in examination and photographic recording, and for projecting and demonstrating opaque objects and surfaces on a screen. For instance, the instrument may be employed by skin specialists in examining the skin, and especially blemishes or other irregularities on the face of the patient, in order to determine existing conditions so that the proper remedy may be prescribed, and in this connection the more or less enlarged image may be projected upon a screen to facilitate examination and analysis. Means are also provided whereby parts of the instrument may be adjusted to permit the patient to observe the projected image upon the screen.

In carrying out my invention I employ an adjustable reflex image mirror in the main optical axis of the projector in which a photographic objective is located, and these parts are associated with a light source, or light sources for illuminating the object of which the image is to be projected. I also combine with the image mirror and its accessories, an adjustable reflex-projecting mirror forming a second optical axis perpendicular to the main optical axis, and the second mirror projects the light beam in a plane which may or may not be parallel with the plane of the optical axis of the projector.

Means are provided for rotating the reflex-projecting mirror upon an axis perpendicular to the main optical axis of the instrument, in order to vary the direction in which the image is finally directed or projected to a screen located in a plane parallel with the axis on which the projecting mirror is rotatively adjusted.

The image formed by the photographic objective upon the first reflecting mirror or image mirror may be observed through the use of the second or projecting mirror; and in addition, after the proper focus has been obtained, the image mirror may be moved out of projecting position in order that the image may be photographed by the utilization of a conventional camera located in the plane of the main optical axis of the instrument.

In addition to the image mirror and the adjustable projecting mirror I may in some instances employ intermediate transmitting mirrors, as for instance a polarizing prism or mirror and an analyzing prism or mirror having the same properties, and the beam of light passing through this intermediate optical system is polarized, thereby eliminating glare which might otherwise be caused by secondary reflected light coming from the surface of the object.

The light source or light sources are located within the instrument and adjustable for association with the photographic objective in such manner that the light may be focused or concentrated upon the object, or area under observation, either in unison, or independently.

In the accompanying drawings I have illustrated one complete example, and two modifications, of the physical embodiment of my invention, wherein the associated parts are combined and arranged according to modes I have thus far devised for the practical application of the principles of my invention; but it will be understood that changes and alterations may be made in these exemplifying structures, within the scope of my appended claims, without departing from the principles of my invention. For instance, an auxiliary projecting mirror may be employed with the image mirror and the rotatively adjustable projecting mirror; and further, my invention contemplates the use of intermediate transmitting mirrors combined with the image mirror and the rotatively adjustable projecting mirror.

Figure 4 is an enlarged detail vertical longitudinal sectional view of the instrument showing the relation of the mirrors and the photographic objective, with parts in position as in Figure 3.

Figure 5 is a horizontal sectional detail view along the main optical axis of the instrument showing the relation of the adjustable light sources, the photographic objective, and the reflex image mirror, together with the attached camera of Figure 1.

Figures 1, 8:
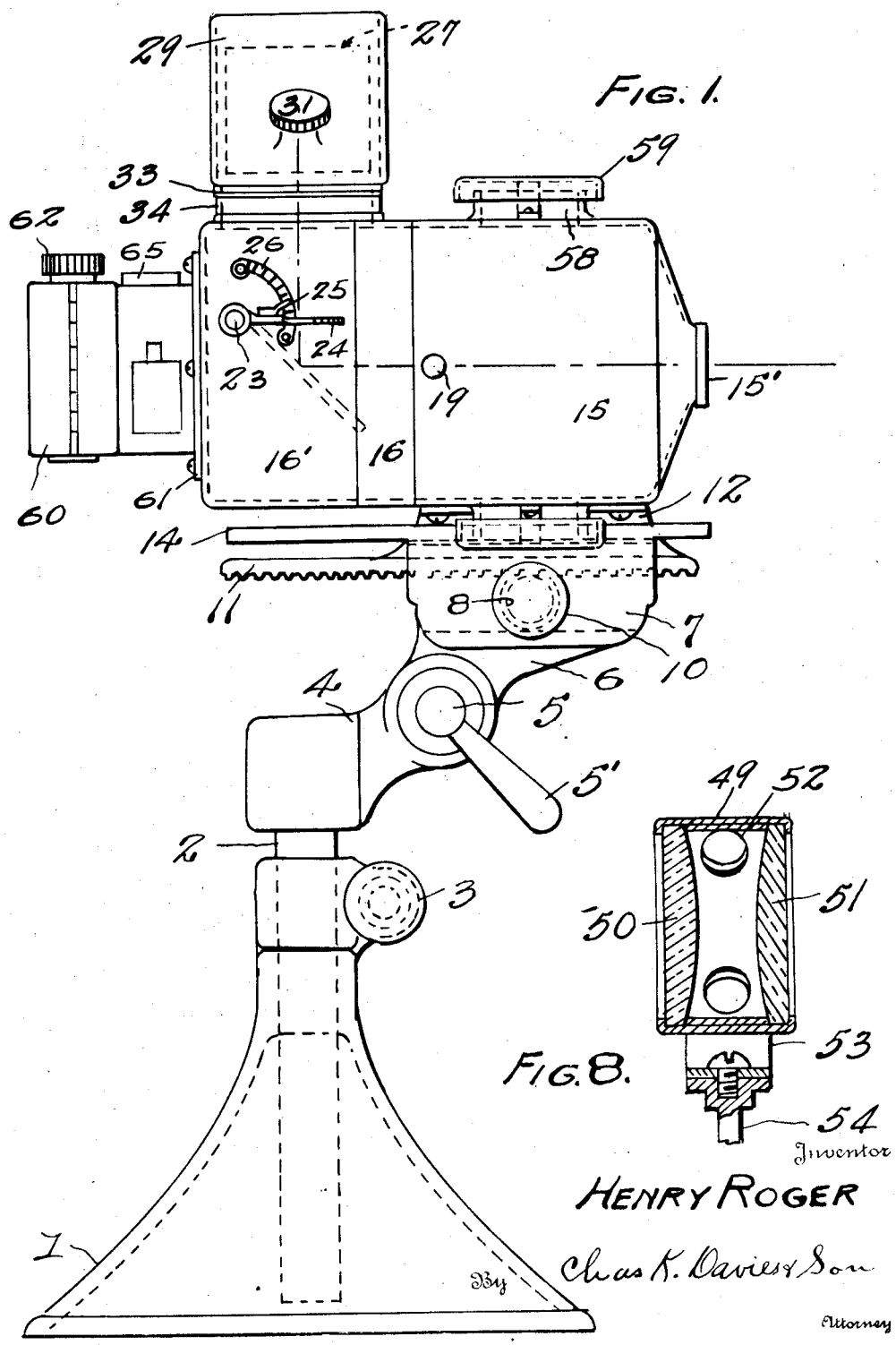
Figure 1 is a view in side elevation showing an optical instrument embodying my invention, equipped with a camera, and showing the projecting mirror adjusted to position for displaying an image upon a laterally disposed screen.
Figure 2:
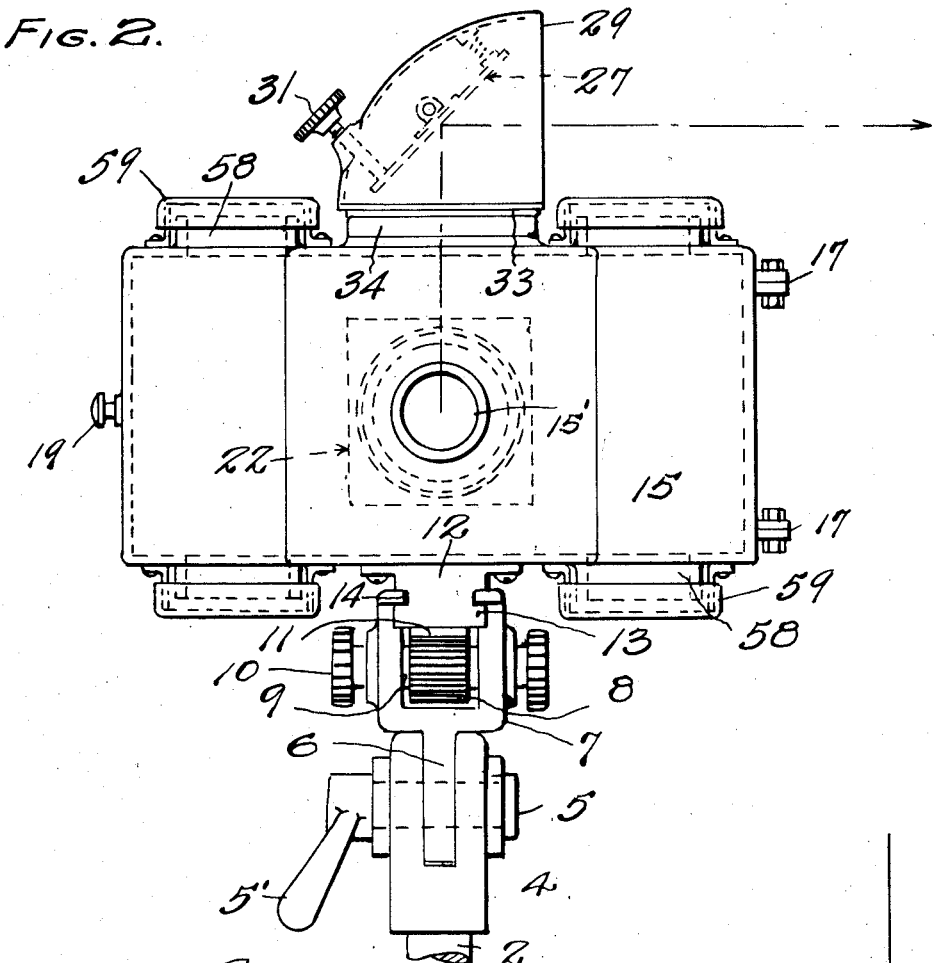
Figure 2 is a front elevation of the instrument, with parts of the support omitted for convenience of illustration, as seen from the right in Figure 1.

Figure 6 is an enlarged side elevation of one of the duplex light sources or units. Figure 7 is a face view of the heat-absorption screen or filter of a lighting unit. Figure 8 is an enlarged transverse sectional detail view of the condenser of one of the lighting units, or sources of light.

Figure 9 is a view in side elevation of the body portion of the projector equipped with an auxiliary adjustable projecting mirror.

Figure 10 is a view in side elevation, partly in section, showing the instrument equipped with auxiliary transmitting mirrors or prisms intermediate the image mirror and the projecting mirror.

In this particular exemplification of the invention I employ a portable instrument mounted upon a suitable base or stand 1 through the use of a post 2, and a clamp device 3 by means of which the instrument may be adjusted as to height. The supporting post is fashioned with a head 4, and a clamp device 5, including the clamping lever 5' by means of which the instrument may be tilted from its upright position disclosed in the drawings through an arc of ninety degrees in order that the optical axis of the instrument will be perpendicular to a horizontally disposed object or surface the image of which is to be projected. The projector can of course be adjusted to a lesser angle than ninety degrees, in its forward tilting, and with equal facility the instrument may be tilted backwardly on its pivot pin 5.

The pivotal connection of the clamp 5 includes a perforated ear 6 that is integral with a housing 7 in which a pinion 8 is mounted on its shaft 9, and the shaft is journaled in the side walls of the housing and provided with exterior turning heads 10, 10, that are utilized in projecting or retracting the instrument toward or from the object or surface area to be observed and projected.

The pinion enclosed in the stationary housing co-acts with a rack bar 11 integral with a rack plate or slide 12, and this slide is fashioned with a pair of parallel spaced slide tongues 13 that form grooves for the complementary tongues 14 of the stationary housing. By means of the rack and pinion arrangement, or other suitable devices, the instrument may be projected or retracted along the line of its main optical axis for focusing and adjusting the projector to its desired working position.

The slide 12 is rigidly mounted on the underside or exterior bottom of the instrument casing, and is directly attached to the stationary light-protection casing section 15, or lamp housing, which housing is provided with a front central object-aperture 15' designed to be adjusted adjacent to or in proximity with the object or surface area to be projected.

The rear portion of the front stationary casing-section or lamp housing is closed by a complementary section 16 that is hinged or pivoted at 17 to the front section or lamp housing, and this hinged rear section of the projector, when in closed position, may be fastened to section 15 by a suitable spring catch, as indicated at 18 in Figure 5. This closure-fastener may be of conventional type, and as shown it is released by depressing the button 19, when it is desired to open the casing to gain access to its interior parts.

In addition to the hinged section 16 of the casing, an extension or mirror compartment 16' is fashioned at the rear of the casing 16, which compartment, as best seen in Figure 5, is of less width than the section 16, but of approximately the same height. This compartment has an open rear wall 16a, and it also has an open front that projects into the section 16 with its front edge terminating approximately on the line of the hinge-joint of the hinged part of the casing. The open front of the extension 16' is closed by a partition 20, and the interior of this extension forms the mirror compartment 21 for an image prism or mirror 22 that is mounted in the compartment along the optical axis of the projector.

This image is movable, and it is mounted for adjustment on a pivot bar or pin 23 journaled in the side walls of the compartment or extension 16', and one end of the pin is conveniently provided with an adjusting handle 24 exterior of the casing, for use in moving the mirror on its pivot. As seen in Figure 1, suitable means may be provided for retaining the image mirror in adjusted position in the main optical axis of the projector, and for this purpose an arcuate or segmental rack 26 is mounted on the exterior face of the casing, and a detent 25 is mounted on the handle 24 for engagement with the rack.

As indicated in the drawings this image mirror, when in projecting position, intercepts the main optical axis of the projector, which axis is here shown as horizontal, and the mirror is positioned at an angle of forty-five degrees to the optical axis, so that a light beam traveling along the optical axis of the projector and impinging against the reflecting surface of the mirror will be reflected upwardly, the angle of incidence being ninety degrees, or at right angles to the main optical axis of the instrument.

Such a light beam, with its image, encounters an adjustable projecting mirror 27 which is mounted on a pivot bar or pin 28 that extends transversely across the interior of a rotatively adjustable hood 29 mounted on top of the extension 16' and forming part of the instrument.

This mirror 27 may be precisely adjusted with relation to the image mirror 22, and of course the latter mirror may be adjusted with relation to the projecting mirror. The projecting mirror may be swung on its pivot pin by turning the screw 30, which is threaded in the wall of the hood 29, with its inner end bearing against the back of the mirror 27. By turning the exterior knurled head 31 of the screw the mirror may be adjusted against the tension of a spring 32, which is interposed between the back of the mirror and the inner face of the hood 29, and this spring, as shown, is located at the opposite side of the mirror-pivot from the adjusting screw.

In addition to the pivotal movement of the projecting mirror, the hood 29, in which the mirror is mounted, is adjustable on an axis perpendicular to the main optical of the instrument, throughout the three hundred and sixty degrees of the circle, thus permitting the mirror 27 to be located in such position that it will project an image in any radial direction.

For this purpose of varying the radial direction of the projected light beam and image, the rotatively adjustable hood with its projecting mirror is mounted at the rear of and upon the top of the instrument casing, through the use of a bottom flanged ring 33 which engages in an exterior groove at the top edge of a cylindrical base-ring 34 that is mounted directly on the top, or top wall of the casing-section 16', and a retaining ring 35 secured on the top edge of the base ring overlaps the flanged ring 33 of the hood to guide the movement of the hood and prevent its displacement.

Figure 3:
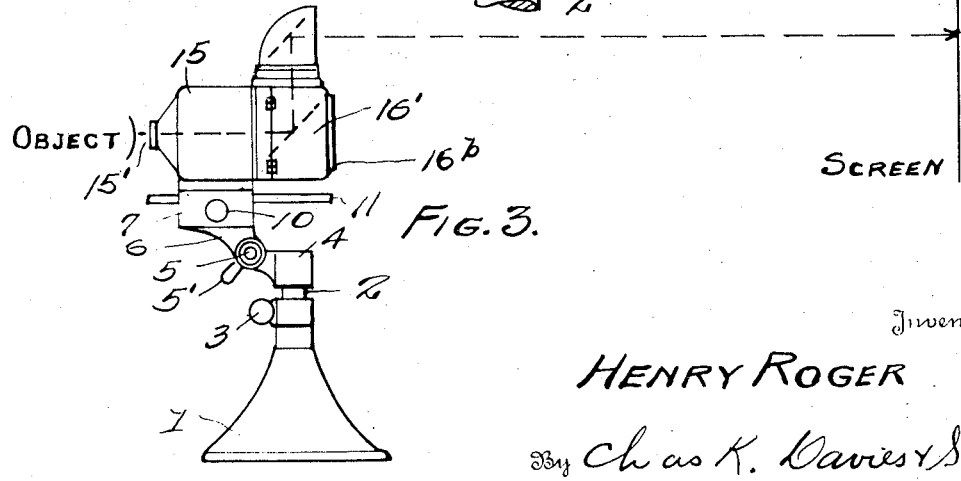
Figure 3 is a view in side elevation, on a reduced scale, as seen from the far or opposite side of Figure 1, with the instrument adapted to project the image upon a screen through a plane parallel with the main optical axis of the projector.

By means of the dotted lines in the various views the main optical axis, the axis of reflection and the axis of projection are indicated, and in Figure 3 the position of the object is indicated, together with the screen on which the image of the object is to be projected or displayed. The mirrors are capable of required adjustments, and the projecting hood may be adjusted for projections in various directions as indicated. In Figure 3, if the patient is looking directly at the aperture 15', the image displayed on the screen, directly in front of the patient and back of the instrument, may readily be observed by the patient, if desired.

For illuminating the object, or surface area, light rays from one or more light-sources or lighting units, may be concentrated at and through the light aperture 15', and two of these light sources or units are indicated at A and B. The plurality of lighting units are located within the section 15 of the light-protection casing and they direct their rays in a plane parallel with the horizontal line of the optical axis of the instrument, but preferably at angles to or obliquely of the optical axis, the light rays being concentrated at the object-aperture 15' or on the spot of the object to be projected as indicated in Figure 5. The units are pivotally supported at their front ends so that they may be adjusted as desired, and retained in adjusted position, and for this purpose a base plate 39 is employed, which is swiveled on a clamp screw or bolt 40 that is threaded in the bottom of the casing section 15. By turning the head 41 of the screw the pivotal joint may be tightened or loosened in the adjustment of the lighting unit, and when the desired position is located for the lighting unit, the plate may be fastened in place.

Upon the upper face of the base plate 39 a suitable lamp 42 is mounted through the use of a conventional socket 43, and the wire connections to the source of light supply are made at the usual terminals 44, 44. The lamp is disposed in a plane coincident with the optical axis of the instrument, and at the rear of the lamp a spherical mirror or reflector 55 is mounted and adjustable toward and away from the lamp through the use of an adjusting screw 46 and its head 47, the screw being mounted in a bracket 48 that is fastened to the base plate.

In front of the lamp is mounted a condenser system, which as best seen in Figure 8 includes a cylindrical housing 49 in which the spaced lenses 50 and 51 are mounted, and vent openings are indicated at 52 for circulation of air through the housing and between the lenses. The condenser lenses 50, 51 are mounted in a U-shaped spring retaining yoke 53 secured at the top of the bracket 54 and the latter is mounted on the base plate.

In front of the condenser lenses are also mounted a heat absorption screen or filter in the nature of a lens 55 that is conveniently held in the U-shaped spring yoke 56 mounted on the top of the bracket 57 secured to the base plate.

For ventilating the interior of the instrument casing to eliminate heat generated from the lamps I provide vent openings 58 in the bottom and top walls of the light chamber, and these openings are partially covered, to prevent light rays emanating from the interior of the light chamber except through the aperture 15'. For this purpose the openings are provided with spaced caps 59 mounted on the bottom and top of the casing 15 with the free edges of the caps overlapping the free edges of the vent openings. It will be evident that the heated air currents rise from the interior of the light chamber and pass out through the top vents, while cooler air currents from the atmosphere enter the lower vents to complete the circulation.

For use in making a photographic record of an object or surface area, the rear wall of the mirror chamber or compartment 16' is provided with an exposure opening 16a in Figure 4. This exposure opening, under some circumstances may be closed by the use of a back plate 16b, as in Figures 3 and 4.

For photographic purposes, the back plate 16b is omitted, and the exposure opening is closed by the use of a conventional camera 60, fixed to the rear of the instrument by means of an attaching plate 61, which plate, of course does not close the exposure opening, but prevents access of natural light to the interior of the instrument.

The camera is located in the main optical axis of the projector, at the rear of the mirror chamber 21 and at the rear of the objective lenses 37 and 38, and during the photographic operation the polarizing mirror 22 is turned upwardly on its pivot, out of the optical axis of the camera, and in position to prevent entrance of light rays to the interior of the mirror chamber.

The camera may be of any suitable type, and for convenience of illustration I have indicated in Figure 5 a film winding mechanism 62, a focal plane 63, and a film 64, but it will be understood that plates may be substituted for the film. A folding hood is indicated at 65, which may be opened for picture taking purposes, and as thus described it will be apparent that the instrument may be employed for photographic operations in manner similar to a camera. For making photographic records, the duplex lighting units, one or both of them, may be employed for illuminating the object to be photographed, thus insuring clear cut pictures of the object, or of the surface area to be photographed.

The duplex lighting units, as before stated, may be employed in unison, or independently, depending upon the degree of intensity of the illumination required, and the electric lamps are controlled by a suitable switch or switches, to throw a spot of intense light upon the object of which the image is to be projected, or to be photographed.

In the operation of projecting an image from an object to the screen, the beam of light rays passes along the main optical axis of the instrument, and through the photographic objective or optical system, and the latter forms the image upon the reflex image mirror 22, and this mirror reflects the image to the projecting mirror 27, where the image may be observed by peering through or into the open front of the rotatively adjustable hood 29, and of course the proper adjustment of mirrors is made to insure a clear cut image.

In the modification of the invention shown in Figure 9, in addition to the use of the image mirror and the rotatively adjustable projecting mirror, I employ an auxiliary projecting mirror 66, which, in combination with the mirror 27, permits of a wide range in projection of the image. This auxiliary mirror is conveniently located and supported at the front of the projector on top of the lamp housing 15, in position to receive a light beam and image reflected from the mirror 27, as indicated by the dot and dash lines. For a universal adjustment with relation to the main projecting mirror 27, the auxiliary projecting mirror is shown as mounted on a ball and socket joint 67 secured to the projector, which joint permits the auxiliary mirror to be turned in various directions with relation to the main projecting mirror, for displaying the reflected image upon the screen. In addition, if required, the universal joint 67, permits the auxiliary projecting mirror to be turned down to inoperative position with relation to the main projecting mirror.

In Figure 10 a further modification of the invention is illustrated, wherein the projector is equipped with an intermediate transmitting optical system including multi-mirrors for transmitting the image from the image mirror 22 to the projecting mirror 27. These transmitting mirrors, here shown as two in number, preferably have identical properties, and they are especially effective in eliminating glare from the light beam, which glare might otherwise be caused by secondary reflected light coming from the surface of the object, and by this elimination of glare from the light beam a clear cut image for projection upon the screen is insured.

In equipping the projector with this intermediate transmitting optical system, I employ an added housing or closed extension 68 mounted on the top of the mirror compartment 21 or the extension 16', which added housing forms parts of the hinged rear portion of the projector, and this auxiliary or added housing is open to the interior of the mirror compartment 21. Two opposed forty-five-degree mirrors 69 and 70 are rigidly mounted in the auxiliary housing, the mirror 69 being set at an angle of forty-five degrees to the perpendicular, or at such an angle to the image mirror to receive the light beam from the plane of the optical axis of the projector. The second mirror 70 is reversed and set at an angle to receive the light beam and image in a plane parallel with the optical axis of the projector, and this second reflex mirror 70 transmits the image at an angle of ninety degrees to the projecting mirror 27, from which the image is projected as indicated in Figure 10.

The intermediate transmitting optical system, comprising two or more reflecting mirrors, for the transmission of the light beam and image, is thus interposed between the image mirror and the rotatively adjustable projecting mirror, which latter mirror is mounted in its hood 29 above the auxiliary housing or extension 68.

In some instances I may employ a magnifying lens 71 that is pivotally supported at 72 in the frame between the top of the mirror compartment 21, and the bottom portion of the auxiliary housing 68, and as indicated by the arrow, this auxiliary lens may be turned to inoperative position when not required for use.

For convenience of illustration and description I have referred to the projector as used by skin specialists, but it will be apparent that the instrument may be adapted for a variety of uses in both scientific and industrial work.

Having thus fully described my invention, what I claim as new and desire to secure by Letters Patent is:

1. In an episcopic projector, the combination with a light-protection casing having a rear mirror-compartment, and a separate front light-chamber having an object-aperture in its front wall and alined with the optical axis of the projector, and a projection-objective mounted in the rear wall of the light chamber alined with the optical axis, of a light source in the light chamber adapted to illuminate the aperture, an image-mirror in the mirror compartment, and a projecting-mirror mounted in position to intercept a light beam from the image mirror and project said beam upon a screen.

2. In an episcopic projector, the combination with an enclosing, light-protection, casing having a rear mirror compartment, a front separate light chamber having an object-aperture alined with the optical axis of the projector, a projection-objective mounted in the rear wall of the light chamber, and an adjustable lighting unit mounted in the light chamber for directing a light ray to said aperture, of a projecting-hood open to the rear compartment and mounted on the casing, an adjustable image-mirror mounted in the mirror compartment and alined with the optical axis of the projector, and an adjustable projection mirror mounted in the hood to intercept a beam of light from the image mirror.

3. In an episcopic projector, the combination with a casing having a front light chamber and a separate rear mirror chamber, a projection-objective mounted in the rear wall of the light chamber, an image-mirror in the mirror chamber alined with the projection-objective in the optical axis of the projector, and said light chamber having in its front wall an object-aperture alined with the optical axis, of a base-ring mounted on an open wall of the mirror chamber on an axis perpendicular to the optical axis, a projecting hood rotatively mounted on said base ring, coacting retaining means on said ring and hood, a pivotally mounted spring-returned projecting-mirror in said hood, and an adjusting screw mounted in the hood in engagement with said mirror.

4. In a projection apparatus, the combination with a light-protection casing including a mirror-chamber having an exposure opening and a separate light-chamber having a front object-aperture alined with the optical axis of the apparatus, and a system of objective lenses mounted in the optical axis between said chambers, of a removable mirror mounted in the mirror-chamber and alined with the optical axis, and a light-source mounted in the light-chamber adapted to illuminate the object-aperture in front of the objective lenses.

5. In a projection apparatus, the combination with a light-protection casing having an interior partition forming a front light-chamber having an object-aperture and a rear mirror-chamber having a rear exposure-opening alined with the optical axis of the apparatus, of a lighting-unit mounted in the light-chamber to direct a light-ray to said aperture, a system of objective lenses mounted in said partition intermediate said chambers, a movable mirror mounted in the mirror-chamber in front of the exposure opening and alined with the optical axis, and means for moving said mirror from the optical axis.

6. In a projection apparatus, the combination with a light-protection casing forming a front light-chamber having an object-aperture, a separate mirror-chamber having a rear exposure-opening in one wall, a projection objective mounted in the front wall of the mirror chamber and aligned with the optical axis, said aperture and opening being alined with the optical axis of the apparatus, and said mirror-chamber having a projection-opening in a wall located in a plane at right angles to the first mentioned wall, of a lighting unit mounted in the light-chamber adapted to illuminate said aperture, a mirror pivotally mounted in the mirror chamber in front of the exposure opening, and means for moving said mirror out of the optical axis to close said projection-opening.

7. In an episcopic projector, the combination with a light-protection casing including a front light-chamber having an object-aperture alined with the optical axis of the projector, and a lighting-unit in said chamber adapted to illuminate said aperture, of a hinged casing-section forming the rear wall of said chamber, said hinged-section having a closed extension forming a mirror-chamber and an adjustable image-mirror in said chamber, and a projection-objective mounted in the front wall of the mirror chamber between said aperture and mirror and alined with the optical axis of the projector.

8. In an episcopic projector, the combination with a light-protection casing including a front light-chamber having an object-aperture alined with the optical axis of the projector, and a lighting unit in said chamber adapted to illuminate said aperture, of a hinged casing-section forming the rear wall of said chamber, said section having a rear-extension forming a mirror-chamber and an adjustable image-mirror in said chamber intercepting the optical axis, a projection-objective mounted in the front wall of the mirror-chamber and alined with the optical axis, a rotatively adjustable hood open to and mounted on the rear extension, and a second mirror in said hood adapted to project a light beam coplanar with the optical axis.

9. In a projection apparatus, the combination with a light-projection casing including a mirror-chamber having an exposure opening and a separate light-chamber having a front object-aperture aligned with the optical axis of the apparatus, and a system of objective lenses mounted in the optical axis between said chambers, of a removable mirror mounted in the mirror-chamber and aligned with the optical axis, a light source mounted in the light-chamber adapted to illuminate the object aperture in front of the objective lenses, and a camera located exterior of the mirror-chamber at the exposure opening and having its optical axis aligned with the optical axis of the projection optical axis and adapted for use when the mirror is moved from the optical axis of the projection apparatus.

HENRY ROGER.